Patented June 8, 1943

2,321,296

UNITED STATES PATENT OFFICE 2,321,296

MANUFACTURE OF MERCAPTO-THIAZOLINES

Louis H. Howland, Cheshire, Conn., assignor to United States Rubber Company, New York, N. Y., a corporation of New Jersey No Drawing. Application September 26, 1940, Serial No. 358,425

5 Claims. (Cl. 260—302)

An object of this invention is to provide a new process for the manufacture of 2-mercapto-thiazolines. Another object is to provide such a process which is economical to practice and yielding a highly commercial product.

According to the invention, a beta-amino alkyl sulphuric acid is reacted with an alkali trithiocarbonate using a liquid single phase medium, namely water, alcohol, or alcohol-water. A single phase medium is different from a two-phase system such as carbon disulphide and water, in which the low boiling liquid carbon disulphide layer would tend to limit the temperature of reaction and thus would bring about a long-time reaction in contrast to the present procedure.

The present reaction is illustrated in the following manner:

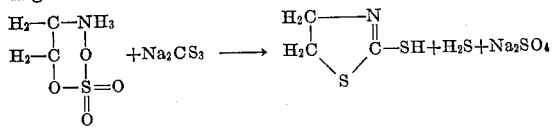

The following example illustrates the preparation of 2-mercapto-thiazoline:

Example

Twelve and three tenths gm. of 2-amino-ethyl sulfuric acid (prepared from ethanol amine and 80% sulfuric acid according to J. A. C. S. 60, 2312 (1938)) or any other method known to the art, are added to a solution composed of 15.5 gms. of sodium trithiocarbonate in 42 cc. of water and the resulting solution consisting of one liquid phase is heated on a steam bath for 6 hrs., during which time hydrogen sulfide is evolved, and the mixture is then cooled. Crystals of 2-mercapto-thiazoline separate. These are filtered and dried; melting point, 106–108° C. The crystals may then be pulverized to any desired degree of fineness desirable for commercial use.

It is understood the procedure is not to be limited to the exact description in Example 1 above. Instead of using sodium trithiocarbonate, other alkali metal salts of trithiocarbonic acid may be used. Further, it is not necessary to use crystalline 2-amino-ethyl sulfuric acid, but instead the crude reaction mixture from the preparation of this material or an alkali metal salt of the relatively pure crystalline 2-amino ethyl sulfuric acid or of the crude 2-amino ethyl sulfuric acid may be employed. The reactants in the example, sodium trithiocarbonate and beta-amino ethyl sulfuric acid may be made by any of the methods known to the art.

An excess of sodium trithiocarbonate may be used if desired.

In the reaction between beta amino ethyl sulfuric acid and sodium trithiocarbonate, small amounts of alkali up to sufficient alkali for complete salt formation with the acid may be present during the reaction to form mercapto thiazoline.

The preferred temperatures of reaction are from 70° C. to 100° C. although the invention is not limited to these temperatures.

Although agitation is not mentioned in the above example, it may be employed during the course of the reaction. The time of mixing of reactants may be slow or rapid.

Also the method of the invention is not limited to method of heating, type of reaction vessel, order of addition of reactants, or the amount of water used in the reaction.

Having thus described my invention, what I claim and desire to protect by Letters Patent is:

1. A method which comprises reacting a 2-amino alkyl sulfuric acid, with a preformed alkali trithiocarbonate in a solvent selected from the class consisting of water, alcohol, and alcohol-water.

2. A method which comprises reacting a 2-amino-alkyl sulfuric acid, with a preformed alkali-metal trithiocarbonate in a solvent selected from the class consisting of water, alcohol, and alcohol-water.

3. A method which comprises reacting a 2-amino alkyl sulfuric acid, with a preformed alkali-metal trithiocarbonate in a solvent selected from the class consisting of water, alcohol, and alcohol-water, and recovering a 2-mercapto thiazoline.

4. A method which comprises reacting a 2-amino-ethyl sulfuric acid, with a preformed alkali-metal trithiocarbonate in a solvent selected from the class consisting of water, alcohol and alcohol-water, and recovering 2-mercapto-thiazoline.

5. A method which comprises reacting a 2-amino-ethyl sulfuric acid, with a preformed sodium trithiocarbonate in a solvent selected from the class consisting of water, alcohol and alcohol-water, and recovering 2-mercapto-thiazoline.

LOUIS H. HOWLAND.